Dec. 23, 1952 K. F. FRANK 2,622,437
ROTOR BALANCING MACHINE
Filed Oct. 30, 1945 6 Sheets-Sheet 1

Fig. 1.

INVENTOR
KARL F. FRANK
BY
Herbert
his ATTORNEY

Dec. 23, 1952         K. F. FRANK         2,622,437
ROTOR BALANCING MACHINE Filed Oct. 30, 1945         6 Sheets-Sheet 2

INVENTOR
KARL F. FRANK
BY
Herbert A. Thompson
his ATTORNEY.

Dec. 23, 1952    K. F. FRANK    2,622,437
ROTOR BALANCING MACHINE
Filed Oct. 30, 1945    6 Sheets-Sheet 3

INVENTOR
KARL F. FRANK
BY
his ATTORNEY.

Dec. 23, 1952 K. F. FRANK 2,622,437
ROTOR BALANCING MACHINE
Filed Oct. 30, 1945 6 Sheets-Sheet 4

INVENTOR
KARL F. FRANK
BY
Herbert A. Thompson
his ATTORNEY.

Patented Dec. 23, 1952

2,622,437

UNITED STATES PATENT OFFICE 2,622,437

ROTOR BALANCING MACHINE

Karl F. Frank, Brooklyn, N. Y., assignor to The Sperry Corporation, a corporation of Delaware Application October 30, 1945, Serial No. 625,562

6 Claims. (Cl. 73—66)

This invention relates, generally, to the balancing of symmetrical rotating bodies and more particularly, to a novel apparatus especially adapted for precision balancing of gyroscope or other high speed rotors at their normal speed of rotation.

The difficulties encountered in the use of previous apparatus for the testing and balancing of moving bodies or machine parts, such as gyroscopic rotors, included the necessity of too many adjustments and operations when a change from one type of rotor to another was made. Another difficulty encountered with previous balancing machines arose in the fact that they could not be calibrated to measure the proper resultants of static and dynamic unbalances, and they also lacked the necessary sensitivity for precision balancing.

The determination of the magnitude and position of the unbalance in a rotor should preferably be effected while it rotates at a speed approximating its normal speed of operation.

Further, the position of a weight unbalance in a rotor must be determined with relation to an arbitrary predetermined point on the rotor and therefore, in order to locate the position of unbalance, it is necessary to provide a signal which will continuously give an indication of the location of that reference point while the rotor rotates. In apparatus known to the art, means generating a series of potential impulses having a frequency corresponding to the speed of rotation of the rotor have been provided and these impulses correspond to the instantaneous position of said predetermined reference point relative to a fixed point. These series of potential impulses are produced with the aid of a source of light from which a stationary beam of light is projected against and reflected by a polished section on the circumference of the rotating rotor to a photocell.

The point of reflection on the circumference of the rotor then constitutes a fixed point, while the reference point on the rotor may be arbitrarily selected for example to coincide with one of the border lines between the polished spot or section and the remaining dull section of the circumference of the rotor.

Assuming that the revolving rotor is supported in such manner, for instance at one end only, that its other end is not restrained from motion, then, if the rotor is unbalanced, the unbalanced weight will cause the free end of the rotor to perform a swinging or gyratory movement around the point of support of the rotor, thus causing vibrations of the rotor which have the same frequency as the speed of rotation of the rotor. It has been proposed to utilize these vibrations as a means for determining the magnitude of the unbalance and the position of the same by causing the vibrations to produce an alternating potential having a frequency corresponding to the speed of rotation of the unbalanced rotor, and by the aid of such alternating potential to determine the magnitude of the unbalance, and further, by comparing the phase of said alternating potential with that of the reference signal, i. e., the series of potential impulses, to determine the angular position of the unbalanced weight relatively to the predetermined reference point.

It is noted that all the recent structures employing an electrical pickup arrangement were primarily deficient in one major respect and that pertained to the fact that none of these structures employed a thoroughly free suspension system for holding each end of the tested rotor even though resilient bearing supports were provided because such devices as nodal bars and mechanical motivation of the rotor tended to overcome much of the benefits of the resilient supports, and in precision balancing a certain amount of lost motion resulted by the use of mechanical vibration linkage to the pickup. Furthermore, recent developments did not provide means for accommodating a variety of rotors because the apparatus was encumbered with a nodal bar paralleling the rotor and attached to each resiliently suspended bearing support in an unsymmetrical manner. Therefore, whenever a new type or different sized rotor was to be tested and balanced new nodal points had to be found on the nodal bar, and substitution of a longer nodal bar was frequently required. All these adjustments required time and called for more highly skilled workmen than should be necessary in rapid precision balancing work.

Also it is noted that some structures known to the art did not provide free suspension means for holding both ends of the rotor while under test but rather, the rotor was held in an upright position with the upper part free to move with the above characterized motion. This arrangement was awkward for mass production use since reversal of the rotor, end for end, in the balancing machine was required before a complete set of dynamic unbalance readings could be obtained. Even though some recent developments provided means for eliminating this reversal of the rotors in balancing tests, the balancing machines still demanded a complete adjustment at each of the holding means before dynamic unbalance readings could be taken for each end of the rotor. Furthermore, before dynamic unbalance readings could be taken at each rotor end, the balancing machine would have to be calibrated or set up by placing a balanced rotor with a known unbalanced weight placed therein at a predetermined reference point. This rotor is then rotated at a predetermined speed after which the proper readings and adjustments were made in the machine. Since this operation had to be done for both ends of the balanced rotor, it can be readily seen that too many preliminary steps were required.

Another difficulty found in the use of some of the known devices for balancing rotors was the unavoidable inaccuracy of readings taken at the free end of the rotor, inherently due to the type of suspension used. Careful experiments have shown that if a perfectly balanced rotor is unbalanced as by adding weight at some point along the shaft toward one end of it, the shaft will, when rotated, with both ends free, perform a gyratory movement about a stationary point toward the other end. If the amount of weight added at the same place along the shaft is increased, the amplitude of gyration is increased. If it is decreased, the amplitude is decreased. But in either case the position of the stationary point remains unchanged. Since accurate unbalance readings can only be obtained when both ends of the rotor are free to vibrate and then the readings must be taken at the predetermined stationary points after the planes of unbalance have been selected, it is evident that the driver of the tested rotor cannot be attached to either end of the rotor in a pivoting arrangement since true or unvariable stationary points cannot exist due to extraneous causes of rotor vibrations. Attempts have been made to filter out these unmeasurable and undesirable vibrations by the design of the electrical circuit but this has not proved entirely satisfactory. Also, precision balancing of smooth rotors at their normal high speed rotation was impossible in all previous apparatus.

All previous balancing apparatus were not able to correlate the unbalance of the tested rotor due to the continued effect of static unbalance mode of vibration with dynamic unbalance mode of vibration. That is, all readings taken heretofore in balancing operations were analyzed from a dynamic unbalance mode of vibration viewpoint only.

Therefore, it was an object to devise means which would permit unbalance measurements at each end of the rotor representative of true dynamic unbalance with a proper consideration being given to static unbalance when it existed.

According to the present invention, a true measure of dynamic and static unbalances are obtained by using a new system of rotor suspension, rotor holding or adapter means, rotor propelling means and control means therefor together with electromagnetic pick-off units and an electrical measuring network.

The problem of rotor suspension was solved by suspending each end of the tested rotor horizontally from three vertically disposed symmetrically spaced resilient means 120° apart, supporting and carrying a cradle holder in which specially designed rotor adapters or cradles for different types of rotors are held by adjustable means. It is conceivable that other numbers of resilient means could be used but then the resilience of each means would have to be re- considered from a different mathematical approach. Therefore the invention is not to be limited by such a consideration. The problem of obtaining the unbalance readings at a point where the displacement due to pure static unbalance equalled the displacement due to pure dynamic unbalance is considered hereinafter. An additional problem of rotating smooth rotors without the need of mechanically or magnetically coupling the rotor was solved through the provision of a special nozzle for the air drive described in detail hereinafter.

A principal feature of the present invention is the provision of a novel micro-balancing apparatus to speed up further the mass production balancing of symmetrical rotating bodies such as high speed gyroscopic rotors requiring high precision balancing.

A primary object of the present invention is to provide means in a novel balancing apparatus especially suitable for increased production balancing.

Another object of the present invention lies in the provision of novel adjustable mounting and supporting devices with symmetrical radial elements in a novel balancing apparatus that is so constructed and arranged as to substantially eliminate danger of injury to the rotor trunnions while inserting rotors into and removing them from the apparatus. This apparatus utilizes duplicate electrical pickup units together with rotor adapter means insertable into the mounting devices, one pickup unit with associated parts being located a fixed distance outwardly of each correction plane correlated with a zero deflection point in the tested rotor. This aparatus further utilizes manually operable means for adjusting the separation of the elements radially in the mounting devices. Also manually operable means are provided for allowing a horizontal separation of the respective mounting devices when the longitudinal dimension of the rotor to be tested is different from the previously balanced rotor so that unbalance at both ends of the rotor may be determined upon a single insertion of the rotor.

A further object of this invention is to provide a resilient suspension system at each end of the tested rotor in a rotor balancing machine, such suspension being so formed as to provide free vibration at both ends of the rotor when submitted to unbalance forces having both dynamic and static unbalance modes of vibration and further including resilient elements so spaced axially of the rotor that the displacement reading for a given unbalanced weight is constant regardless of the location or nature of the unbalance.

A further object of this invention is to provide novel air control means in which a pressure regulator maintains a steady flow of air against a revolving rotor.

A further object of this invention is to provide a novel air nozzle suitable for the propulsion of smooth rotors.

A further object of this invention is to provide a novel resilient suspension for a balancing machine, the resilient elements of the suspension having a tension such that the suspension is susceptible to both static and dynamic unbalance modes of vibration.

A further object of the invention is to provide a suspension system in which the major supporting elements are perpendicularly disposed.

A further object of the invention is to provide in balancing apparatus a suspension system capable of adjustment to accommodate many types and sizes of rotors.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Other objects and advantages will become apparent from the specification taken in connection with the accompanying drawings, wherein one embodiment of the invention is illustrated.

Figure 2:
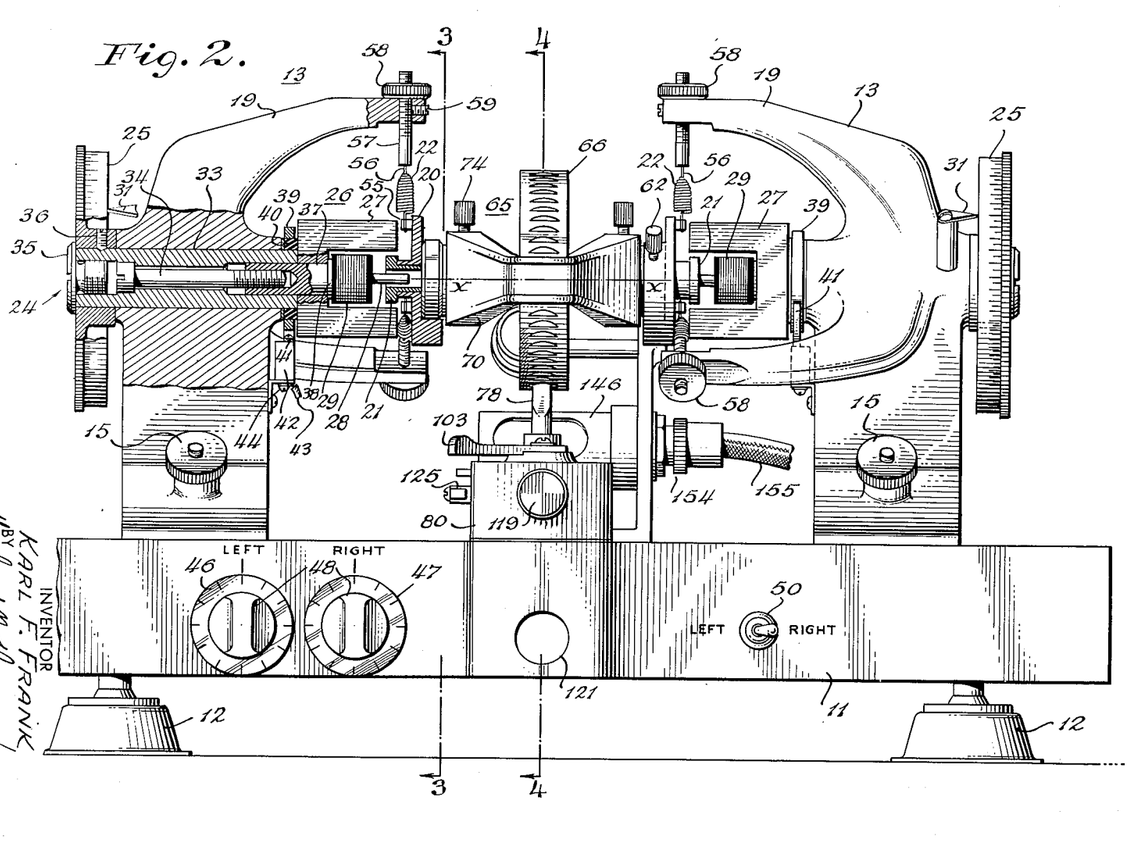
Fig. 2 is a front elevational view of the novel balancing apparatus with portions of the left headstock assembly broken away to show details of the suspension system correlated with one of the electromagnetic pickup units, the spindle assembly, the rotor adapter and the unbalance positional indicator.

In the drawings, the apparatus is shown as comprising a bedplate 11 mounted upon suitable shock-mounts 12, which bedplate carries two headstock assemblies 13 slidable lengthwise on machined bedplate ways 14 when the clamping screw 15 on the bolt 16 within a hole of the headstock is loosened to permit the tongue 17 on the lower end of the bolt to be disengaged from an inner wall of the groove 18. By changing the position of these headstock assemblies, it is possible to check the dynamic unbalance of various types and sizes of rotors. The upper part of headstock assemblies 13 is composed of three arms 19 symmetrically spaced 120 degrees apart, protruding longitudinally and toward the vertically projected center of the bedplate 11. These arms support a cradle holder 20. Since the headstock assemblies 13 are similar for both ends of the apparatus, only one will be described in detail. Each cradle holder 20 is hung from the three arms 19 in a free suspension system comprising resilient means such as helical springs 22. The main body 23 of the headstock assemblies 13 is bored horizontally to receive a spindle assembly 24 as shown in Fig. 2. The outside end of the spindle assembly 24 supports an angular locating dial or unbalance positional indicator 25 cooperating with a fixed pointer or index 31, mounted on a stud and screw arrangement 32 while the other end mounts an electromagnetic pickup unit 26.

Since the pickup units are identical, only one of them, for example, the left-hand one, will be described in detail, reference being had in this connection to Figs. 1 and 2. This pickup instrument 26 comprises one or more horseshoe magnets 27 provided with a central cylindrical depending pole 28 of soft iron on which is wound a coil 29. The horseshoe magnet 27 is adapted to cooperate with the armature 21 having the form of a soft iron ring that is arranged to be fixed upon the cradle holder 20 by a forced fit. This armature 21 oscillates with the rotor axis under influence of rotor unbalance so that with the central pole 28 inserted through the apertured center of armature ring 21, as shown in the left portion partially broken away of Fig. 2, the armature 21 is caused to move in an eccentric path around the pole 28, thereby varying the flux through this pole 28 periodically and generating a voltage in the coil 29 having a frequency corresponding to that of the rotor speed.

Figure 7:
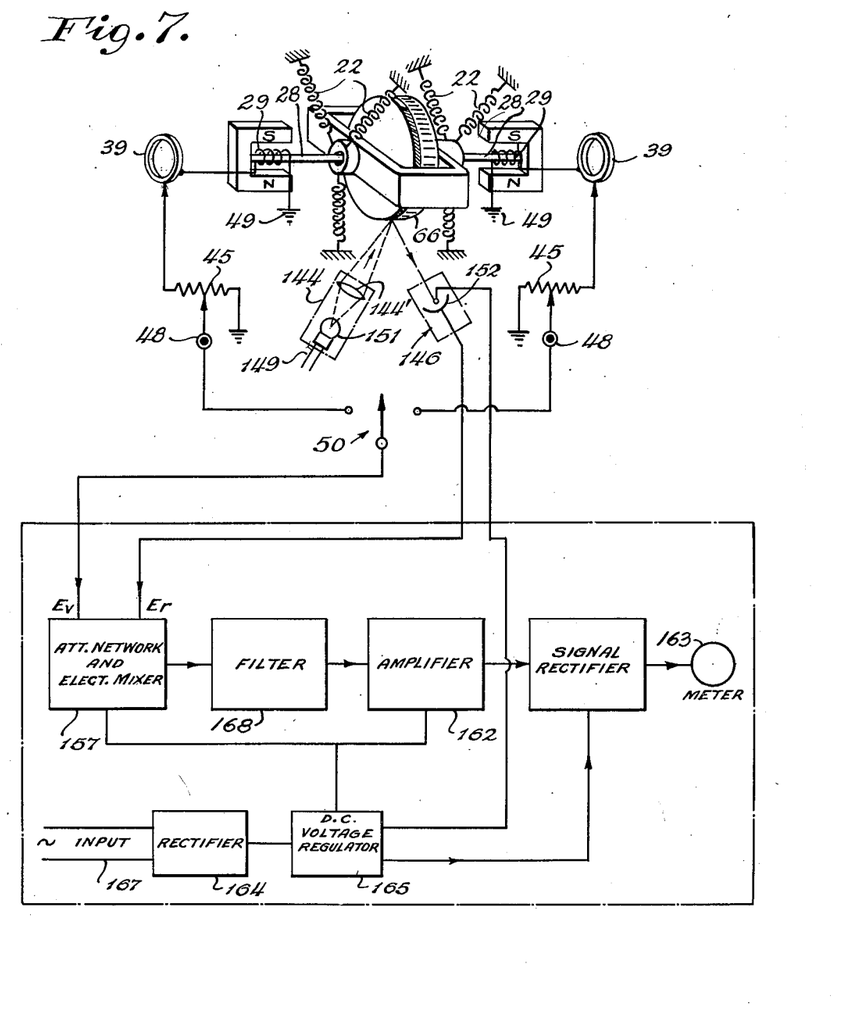
Fig. 7 is a schematic wiring diagram of the electrical system partially in block form of the novel balancing apparatus showing its correlation with the rotor inserted in the suspension system.

The spindle assembly 24 is provided with a shaft 33 having a bore of varying diameters and varying depths for each diameter to accommodate several different sized bolts 34, 35 and a pole shaft 37 integral with and opposite the depending pole 28. Pole shaft 37 has a shoulder 38 abutting the inner surface of horseshoe-shaped magnets 27 while the pole shaft is held within the bore of the shaft 33 by another bolt or cap screw 34 threaded into a hole at the end of the pole shaft 37. The outside end of the shaft 33 is bored a depth sufficient to receive the cap screw 34 recessed within this shaft a distance permitting a larger threaded bore for the reception of cap screw 35 which retains the angular locating dial 25 in position over the end of this shaft. A set screw 36 prevents the dial 25 from turning on the shaft 33. Mounted on the inner end of the shaft 33 is a slip-ring 39 placed over an insulator ring 40 and electrically connected to the positive output side of the electromagnetic coil 29 as shown in Fig. 7. This slip-ring is arranged to turn with the electromagnetic unit 26 when the balancing apparatus is set up for test. A contact brush 41 in a brush holder 42 is attached to but insulated from the headstock body 23 by any convenient means, and a wire 43 is connected to brush 41 by a machine screw 44. This wire leads to a pickup potentiometer 45 shown in Fig. 7 and mounted behind a pickup potentiometer calibrating dial 46 shown in Figs. 1 and 2 and marked "left." A similar dial 47 marked "right" exists for the right electromagnetic pickup unit. The potentiometers themselves are adjusted by turning knobs 48. Returning to the coil 29, it is seen in the circuit of Fig. 7 that the other end of the wire in the coil is grounded at 49 and a single pole double throw switch 50 is so connected with the right and left pickup potentiometers 45 that the midpoint of the switch is always connected to one of the movable contactors of the potentiometer.

The suspension system includes two adjustably spaced groups of preferably three adjustable radially disposed, symmetrically arranged resilient elements 120° apart, such as coil springs 22 in a common vertical plane with one spring being disposed perpendicularly to carry most of the weight of the cradle holder 20 and the rotor mounted in its cradle holder.

The coil springs 22 are connected at their inner ends by 120° spaced pins 55 protruding from the surface of the cradle holder 20 on a circular line remote from the rotor cradle or adapter to be described later. The other end of each of these springs 22 is twisted into a conical form so that a free end 56 exists substantially in the center of a transverse cross-sectional area of each spring, and this free end 56 is welded at a transverse center of an adjusting screw 57 on its inner end fitted into a hole drilled into the free end of each headstock arm 19. All screws 57 are arranged in a common plane at each headstock by careful alignment of the holes containing the same. The outside end of each adjusting screw 57 carries a knurled nut 58 to give stability to the suspension system and to the adjusting screws 57. These adjusting screws when freed for movement permit the alignment of each armature 21 with its magnet center depending pole 28.

Each cradle support 20 opposite the armature side is constructed from a cylindrical non-magnetic body having a horizontally disposed longitudinal axis, the body being large enough to permit a wide vertical slot 60 having a bottom surface defined by a circular arch-shaped surface 61 whose circumference is tangent to the vertical side walls of the slot and whose radius originates at the transverse center of the cylindrical body. The radius of the arch and the longitudinal or horizontal depth of the slot 69 is such that many sizes and types of rotor adapters can be retained therein. A cradle clamping screw 62 protrudes into this slot 60 at a convenient angle to permit firm gripping of a rotor cradle riding on the arch shaped surface or saddle 61.

An analysis of static and dynamic unbalance of a rotor suspended according to the novel thoroughly free suspension system of this invention shows that the distance for the spring separation for a particular rotor must be calculated in accordance with the expression (1) $$S = \frac{2I(\omega_{n2}^2 - \omega^2)}{lm(\omega_{n1}^2 - \omega^2)}$$

where $S$ = distance for the spring separation
$I$ = effective moment of inertia taken about a diameter of the rotor through its mass center due to combined mass and gyro stability.
$m$ = suspended mass
$\omega$ = balancing speed
$\omega_{n1}$ = resonant frequency of the first mode of vibration corresponding to static unbalance which is constant for any one type of rotor.
$\omega_{n2}$ = resonant frequency of the second mode of vibration corresponding to dynamic unbalance which is constant for any one type of rotor.
$l$ = length of particular rotor and where, also (2) $$I = \frac{C}{\omega_{n2}^2}$$

in which $C$ = equivalent torsional spring constant in inch pounds/radian, and $$C = \frac{KS^2}{2}$$

where $K$ = lumped spring constant.

Hence, the value of "$I$" can be determined by obtaining the value of $\omega_{n2}$ experimentally.

The length of the rotor cradle or adapter must adhere to this last formula.

The suspension system described heretofore made it possible to have a definite rotor adapter with each type of rotor tested and balanced and also brought the point or place of taking unbalance measurements outside of the end of the rotor body itself, i. e., in the electromagnetic pickup unit 26. The problem of getting the unbalance readings taken at a point where the displacement due to pure static unbalance or an equal amount of pure dynamic unbalance is the same is solved with an experimental adjustable rotor cradle where the length of this cradle can be selected so that the electromagnetic pick-off units 26 lay in a plane normal to the axis of spin of the rotor where the above-mentioned condition exists.

Resilient elements 22 are designed to have the proper tension when different kinds of rotors are balanced so that the two modes of vibration mentioned above can be obtained.

Figure 1:
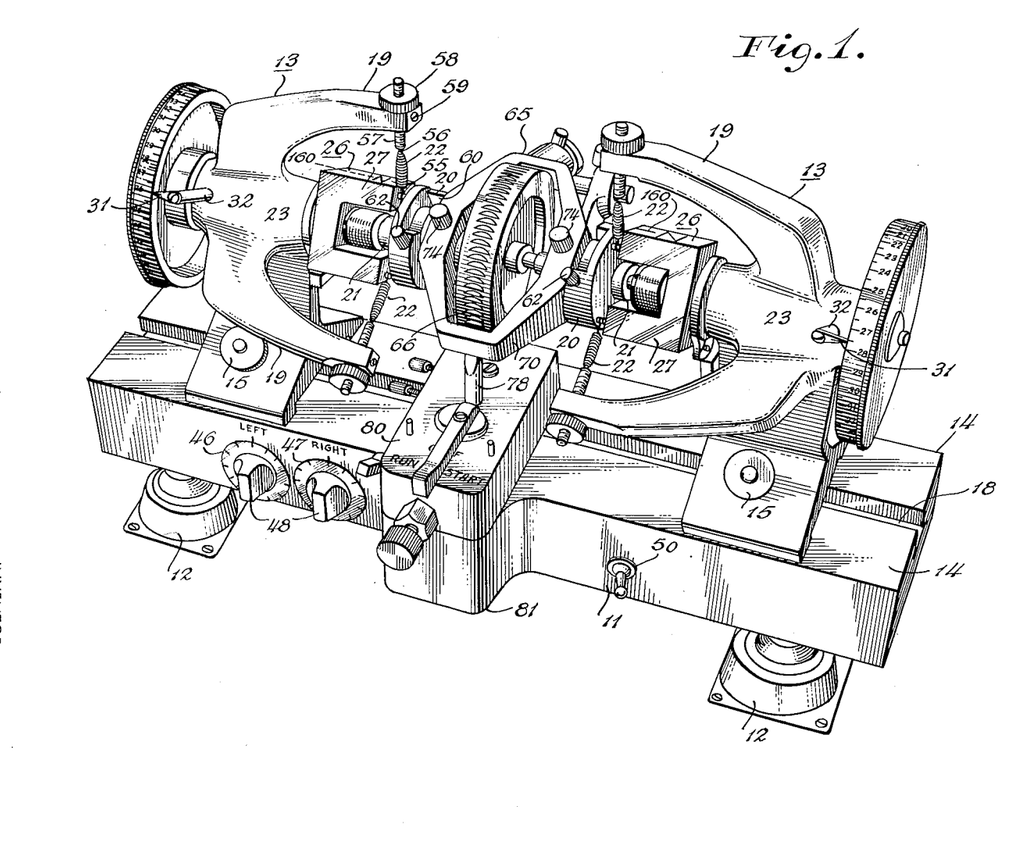
Fig. 1 is a perspective view of the novel apparatus of the present invention showing an adapter or cradle accommodating a rotor mounted within the apparatus for balancing.
Figures 6, 9:
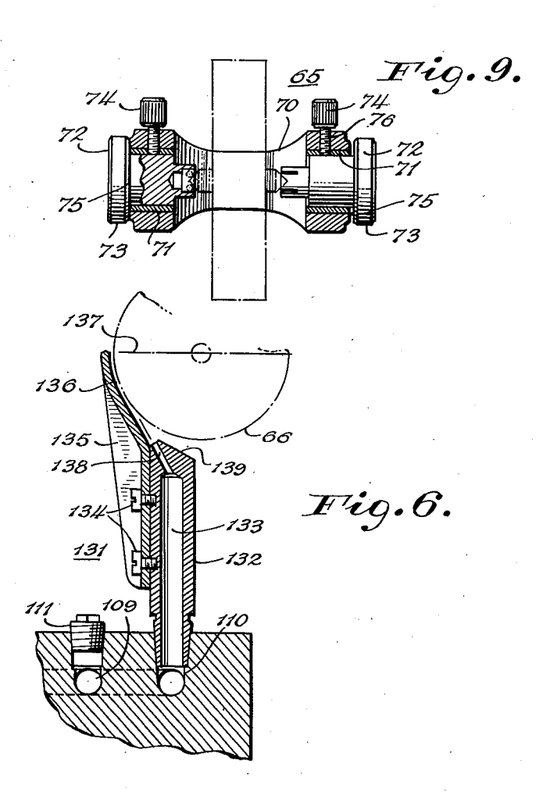
Fig. 6 is a sectional elevation view of the novel air nozzle used in rotating smooth rotors in the novel balancing apparatus.
Fig. 9 is an elevational view, in section, of a novel rotor adapter.

The construction of the rotor cradle 65 is shown in detail in Fig. 9 and it is mounted in the cradle holders 20 in Figs. 1 and 2. The cradle or adapter 65 is formed from a rigid body 70 having a substantially elliptical torus shape symmetrical about both axes. The thickness of the hollow octagon-shaped body 70 is sufficient for a bore 71 on a minor axis $x$—$x$ coinciding with a longitudinal axis of the depending pole 28 when the cradle 65 is in the balancing machine, which bore 71 is large enough to accommodate a bearing sleeve 72 having an outer end surface 73 of a diameter corresponding to the width of the cradle slot 60.

Figures 3, 4:
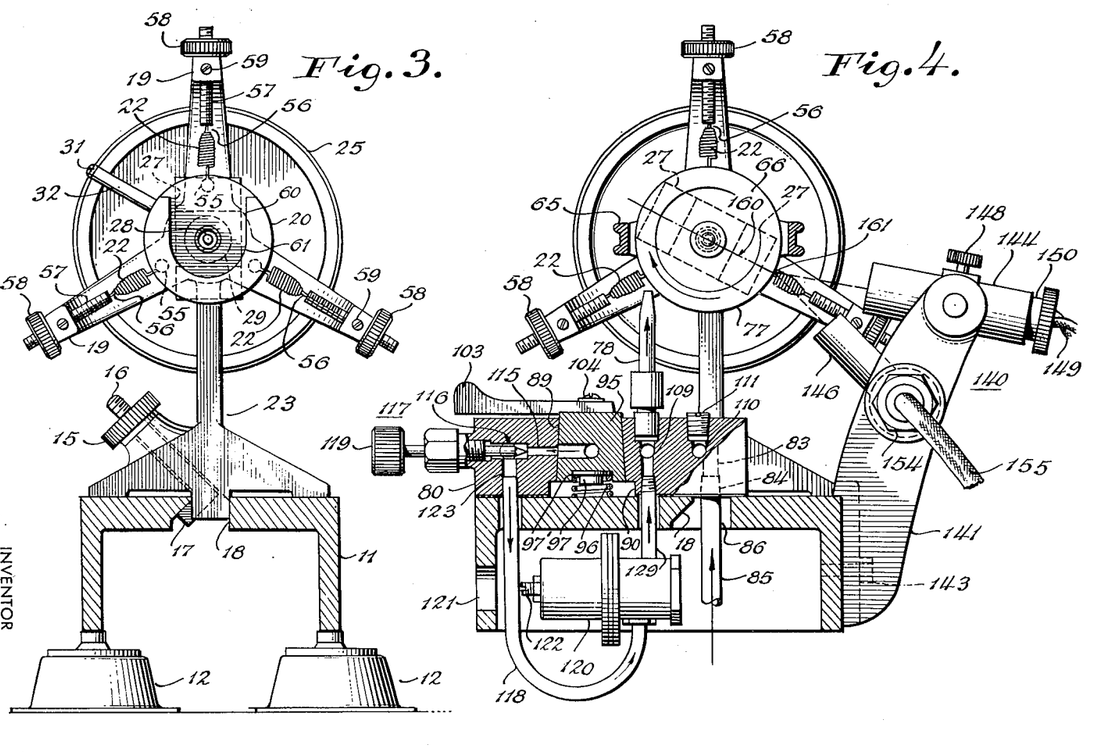
Fig. 3 is an elevation view of the left end of the suspension system, taken on line 3—3 of Fig. 2.
Fig. 4 is an elevation of the left end of the suspension system, taken on the line 4—4 of Fig. 2.

Each sleeve 72 is locked in place on the rotor adapter 65 by adjustment screws 74 which fit in a vertical hole 76 bored and tapped into the top of each bore 71. The cradle 65 has a section marked "Front" on the top side. In preparing the rotors for balancing, the cradle is held with the portion marked "Front" toward the operator and then the rotor is inserted in the cradle or adapter 65 so that it will rotate up and away from the operator. Next, the left sleeve 72 is pushed into the cradle bore on the left so that its shoulder 75 rests against the rotor cradle and then it is locked in place with the left-hand adjustment screw 74. Now, the right sleeve 72 is pressed into the right bore 71 and over the end of the rotor shaft. A light finger pressure is applied to the resultant bearing while the right adjustment screw 74 is tightened. Some adapters are additionally marked with an indicia characterization on the top side for aligning the sides of the tested rotors for both horizon and vertical gyros. Each rotor is first marked with a darkened surface 77, half-way around its circumference as shown in Fig. 4 and disclosed further in the Patent #2,243,458 to Esval et al. before it is inserted into the adapter. The rotor adapter or cradle 65 is locked in the cradle holder 20 by thumb screws 62.

Figure 5:
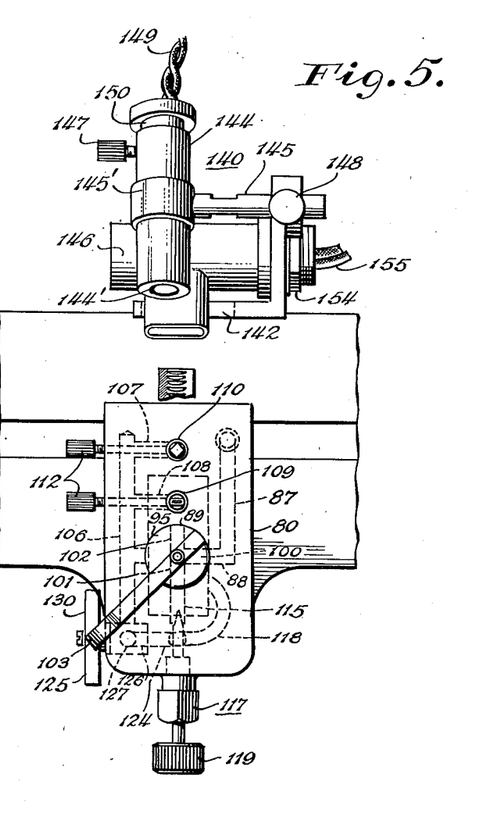
Fig. 5 is a partial plan view of the novel balancing apparatus showing details of the airblock assembly and the photoelectric cell and lamp assembly.

Since the purpose for providing a free suspension system was to avoid sources of vibration which would tend to affect the accuracy of unbalance readings taken at each end of the rotor, it becomes necessary to use a non-mechanical drive for the rotor. However, since air drives known to the art (such as shown in Esval Patent No. 2,243,458) lacked sufficient control means over the air blast under various conditions of rotor operation and also since they could not readily be adapted for use in the testing and the fine precision balancing of the varied sizes and types of rotors found in mass production manufacture, it became necessary to solve these problems by providing new apparatus. The mechanism for controlling the air flow to air nozzle 78 will be discussed later. Air block assembly 80 is a fairly heavy rectangular block-shaped body placed centrally longitudinally on the machined ways 14 of the bedplate 11 but protruding far enough forward toward the operator over a projection 81 of the bedplate 11 to permit ample room for the air nozzle 78 and another nozzle which may be placed on the top of the assembly 80 nearer the center of smooth rotors. In the bottom rear of the block assembly in Fig. 4 on the right-hand side when viewed from the top in the plane view of Fig. 5 there is a vertical duct 83 having a female threaded entrance to receive the male coupling 84 attached to the air hose 85 which is brought up from the under side of bedplate 11 in the center thereof through a hole 86 in the longitudinal center of the bedplate slot 18. In Fig. 5 it is seen that at the top of duct 83 another duct 87 is joined thereto at right angles and leads horizontally forward toward the operator a substantial distance, the terminus of which is joined by still another duct 88 at right angles thereto in a horizontal plane and projecting inward of the air block assembly 80. The forward end of duct 88 leads to a centrally disposed bore 89 formed in the shape of an upright truncated cone for a substantial distance vertically down in the assembly 80, while the base of the cone is met by a larger diameter bore 90. A rotatable valve 95 in the form of a transversely bored plug or bung is held resiliently against the sides of the bore 89 by the spring 96 and plunger 97 seated in a hole 97' bored into the bottom part of the plug or valve 95. Three ports 100, 101, 102 are bored horizontally into this block substantially at its longitudinal center and at angles relative to each other to form a T junction. Therefore, two ports, 101—102, are in line with each other. Valve 95 is turned about its vertical axis by a control lever 103 fastened to its top by any convenient means such as a machine screw 104. When valve port 100 is lined up with duct 88 the control lever 103 is positioned to the left as shown in Fig. 5 and directly under it the label "Run" denotes the "Running" position of the rotor. The ports are so arranged at right angles to each other that a 90 degree counterclockwise rotation of lever 103 will line up ports 102—101 with duct 88. This position of the lever 103 is to be associated with the "starting" of the rotor and the label "start" is inscribed on the top surface of the block 80 underneath the lever 103. The "start" condition of the control valve 95 is first considered. In this position port 102 joins a duct 106 at right angles thereto, parallel with duct 87, and extends substantially the whole length of the block 80 so that other spaced ducts 107 and 108 may be joined to duct 106 at right angles thereto. Ducts 107 and 108 lead to vertical ducts 109 and 110 respectively, the top portions of which are drilled and tapped with a Morse taper to receive either a plug or air nozzle.

In Fig. 4, air nozzle 78 is shown in the exit of port 109 while air plug 111 blocks the exit of port 110. Nozzle 78 is used when bucket type rotors are tested and balanced. When smooth rotors are balanced a novel nozzle is necessary and this is inserted where plug 111 is now seated, nozzle 78 having first been removed and replaced by plug 111. The respective nozzles are held firmly in the Morse taper part of ports 109, 110 by nozzle clamping screws 112. From this arrangement air may come directly from hose 85 to the nozzle used via channels or ducts 83, 87, 88, ports 101, 102 shown dotted, ducts 106, 107 and 108. In this manner a strong blast may be immediately provided that is sufficient to start rotation of very heavy rotors.

First, the condition of testing bucket type rotors will be considered. This requires air nozzle 78. Initially, the full blast of air just mentioned is directed against the bucket type rotor from this nozzle and this onrush of air starts the rotor and produces a fast acceleration of the rotor. Soon the control lever 103 is moved to the "Run" position which places port 100 in line with duct 88. Port 101 joined to port 100 leads through a needle valve 117 and tubing 118 to a pressure regulator 120 situated under the bedplate 11 and then to the nozzle 78 via tubing 129. The needle valve 117 is used to adjust the volume of air flowing to the pressure regulator. Needle valve 117 is inserted within the cavity 116 by the usual threaded means. Cavity 116 has three ducts at right angles to each other. One duct 115 leads to port 101. The air once in cavity 116 can escape into the nozzle 78 by two routes. The route just mentioned requires a second vertical duct 123 in the bottom of cavity 116. A second route starts from a third duct 124 seen in Fig. 5 as being horizontal and at right angles to duct 115 and leads to a pressure regulator by-pass valve 125. Valve 125 contains two ports 126 and 127 at right angles to each other and when the by-pass valve lever 130 is rotated to a position allowing the air to go to duct 106 the pressure regulator is by-passed. This is done when smooth rotors are tested because greater air velocities are required than for bucket type rotors and if the regulator 120 were in the system at this time considerable pressure would be lost thereby. The pressure regulator 120 is adjustable by turning set screw 122 with a screwdriver inserted through the front bedplate hole 121. The testing of smooth rotors requires a special nozzle 131 seen in Fig. 6 to produce a considerable viscous air drag whereby even fairly heavy smooth rotors are rotated at their normal operating speed. Nozzle 131 is shown inserted into a Morse taper hole in the air block leading to duct 110. The protruding section of nozzle 131 is an elongated body 132 with a vertical bore 133, the walls of the bored body being sufficiently thick to accommodate drilled and tapped holes into which machine screws 134 are screwed to hold a shroud or hood 135. Hood 135 is designed to have an arc section 136 close to and concentric with the rotor 66 below the horizontal plane 137 a distance such that when the air is directed tangentially to the rotor from the body 132 of the nozzle 131 through an orifice 138 drilled at an angle to the top of bore 133 a considerable amount of air is pressed against the surface of the rotor to create a viscous drag. By having the top part of the nozzle body 132 designed with a rearward slope 139 sufficient clearance is provided between the body 132 and the lower part of the rotor to make use of a vacuum effect at this point.

The electrical system in the balancing apparatus of this invention is similar to that disclosed in Patent Number 2,243,457 to Esval et al. and therefore an elaborate description of the electrical phase of this invention is unnecessary. Means for generating a signal proportional to the degree of unbalance in a rotating body has been set forth heretofore and now a description of the means for locating the angular position of measured unbalance follows.

A photocell and lamp assembly 140 is mounted in the rear of the bedplate 11 and situated centrally longitudinally thereof by a bracket 141 having a horizontal slot 142 at the lower end for the reception of a set or clamping screw 143 screwed into the back outside wall of the bedplate 11.

Bracket 141 has two upper transverse holes for the reception of an arm 145 and a housing 146 for the photoelectric cell 152, both revolvably supported on this bracket. In addition to the adjustment above, arm 145 is slidable transversely of the bracket in the uppermost of these two holes. The outside end of arm 145 comprises a sleeve 145' at right angles to a bearing formed by the portion of this arm entered in the uppermost hole for the slidable support of the lamp housing 144. Housing 144 is movable longitudinally in the sleeve 145' and clamped with a threaded portion of arm 145 and is also pivotally adjustable about the bearing of arm 145 when knurled thumb screw 148 is loosened. Housing 144 contains a conventional lens system 144' at its forward portion.

Any conventional low power consuming lamp 151 shown in Fig. 7 with a standard socket wired externally to power leads 149 is contained within a tubing 150 snugly fitting within housing 144 and movable longitudinally within the same. Movement of this tubing is prevented by tightening thumb screw 147. This arrangement provides an adjustable intensity illumination for projection against the rotor 66. Reflection therefrom is shown as entering the photocell 152 shown in the wiring diagram of Fig. 7. Photocell 152 is mounted within the housing 146 by any well-known means. By having the bracket 141 slidably supported on the bedplate 11 its position may be changed when the bolt 143 with a knurled head is loosened. This makes it possible to align the center of the front opening in the photocell housing 146 with the light and dark areas on the periphery of the rotor. The cell 152 and lamp 151 which are slidably mounted on the bracket 140 about centers located on an arc the center of which lies in the rotor axis so that the cell and lamp may be readily adjusted to cause their optical axes to intersect at the surface of rotors of different diameters.

When a rotor longer than the previously balanced rotor is to be balanced, both headstock assemblies 13 can be moved along machined ways 14 of the bedplate 11 after the clamping nuts 15 are loosened. Since both headstocks are movable it is possible by moving each the same distance to avoid further adjustments of photoelectric cell and lamp arrangement 140 when the diameter of the rotor is not materially different than the previous rotor. By shifting the lamp housing 144 longitudinally within the sleeve 145' of mounting arm 145 in the bracket 141 the center of the lamp is positioned horizontally with respect to the center of the opening in the photoelectric cell housing, and rotating the mounting arm and the bracket shifts the angular position of the light beam so that the reflected light enters the photoelectric cell housing 146. By rotating the housing 146, it is possible to align the opening in this cell housing with a reflected light beam. Fig. 4 shows the housing 146 and housing 144 properly oriented relative to the rotor 66. The output of photoelectric cell 152 is fed to an electronic mixer and attenuator 157 through wires 155 retained at the housing 146 by conventional coupling means 154.

Up to this point several steps in connection with the preparation of the machine for testing and balancing rotors have been described. These steps included examination of the suspension system, the electrical pickup or pick-off units, the air drive system, the rotor adapter and the photoelectric cell and lamp arrangements. Now, it is necessary to consider how the rotor 66 within its adapter 65 seated within the saddle 61 of the cradle holder 20 is initially oriented with the pick-off units 26 making it unnecessary to calibrate the apparatus with a known balanced rotor provided with a given positioned unbalance. This is done by aligning the longitudinal center 160 of the north pole of each horseshoe magnet 27 with a spot of light 161 projected on the rotor 66 from the lamp 151 within the housing 144 as seen in Fig. 4. Since there is no mechanical connection between the electromagnetic pick-off units 26 containing the magnets 27, the above alignment is possible with the novel spindle mechanism 24 already described. By loosening set screw 36 on the angular locating dial 25 it is seen that the pick-off units 26 can be turned into various angular positions without turning dial 25. When the center line marked 160 in Figs. 1 and 4 is lined up with the spot of light 161 on the rotor as given above, the positional indicator or locating dial 25 is turned about the spindle 33 until the zero mark on this dial 25 is opposite the index finger 31 without disturbing the setting of each north pole. Now the mentioned set screw and machine screw are tightened. Before these settings are made, the soft iron armature ring 21 press-fitted within the transversely centered outside bore of the cradle holder 20 must be properly centered both vertically and horizontally with the electromagnet depending pole 28. Such alignment is produced by first unsetting the set screw 59, loosening each of the knurled nuts 58 in the spring system and then turning the studs 57 until the center of the armature 21 coincides with the center of the depending pole 28. This done, the set screws 59 are set and the nuts 58 tightened. All the above operations and adjustments must be done for both headstock assemblies 13. The weight of the rotor, cradle and cradle holder can be compensated for by an extra turn or two of the perpendicularly disposed studs 57.

In the circuits known to the art the mixing and attenuating network wherein electrical phasing is carried out is composed of a transformer and resistance. In applicant's corresponding network the transformer having various drawbacks is eliminated and is substituted by an electronic arrangement having several electrical control valves. This arrangement eliminates relative phase shift between the unbalance signal and the reference signal so that the phase relation of the two signals merely depends upon the positioning of the pickup elements on the machine. Other distinctions will appear as the circuit is described.

Referring to Fig. 7, it can be seen that the previously mentioned potentiometers 45 mounted back of the right and left dials 46 and 47 respectively in the front panel of the bedplate 11 are connected through a single-pole double-throw switch 50 to an electronic mixer and attenuator 157 shown in block form. Photoelectric cell 152 generates a reference voltage ($E_R$) and these voltages are fed to the attenuator and mixer 157 or to the connector 170 shown in Fig. 8. The output of the above attenuator and mixer goes to a meter 163 after the voltage signals have been filtered by filter 168 and amplified by amplifier 162. Voltages ($E_V$) proportional to rotor unbalance are created in the coils 29 and are fed to the network 157 through potentiometers 45 and selective switch 50. The middle point of the switch 50 is connected to the attenuator and mixer 157. Voltage rectifier 164 and voltage regulator 165 supply power as shown. With this arrangement unbalanced readings for both the right and left ends of the rotor can be selectively taken.

Figure 8:
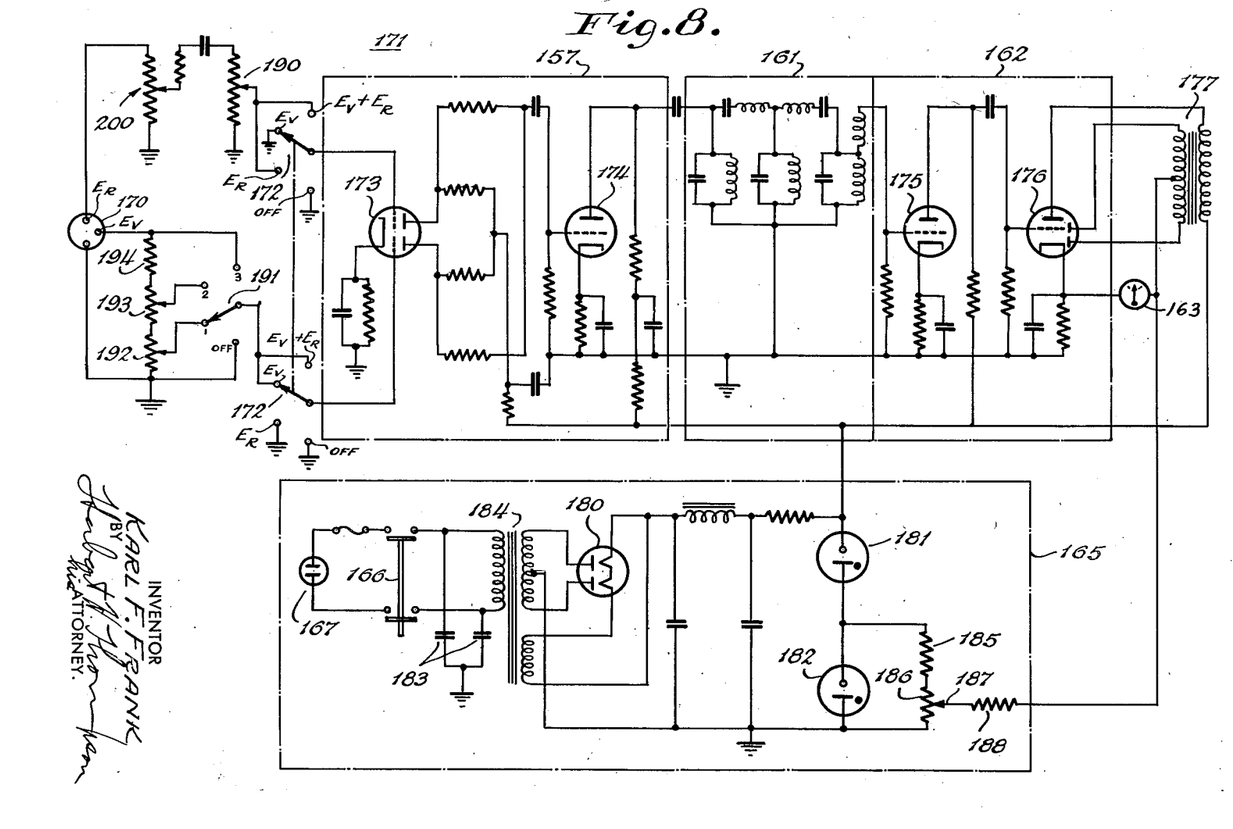
Fig. 8 is a wiring diagram of the amplifier unit of the novel balancing apparatus showing the details of the block portion in Fig. 7 defined by the dotted line.

Fig. 8 illustrates a composite of the network 157, filter 161, amplifier 162, meter 160 and voltage rectifier 164 and regulator network 165 in Fig. 7. Since in actual practice the above circuit elements are found within a single container or cabinet having various exterior controls, the total circuit arrangement in Fig. 8 is called a balancing machine amplifier unit 171. Amplifier unit 171 is a linear voltage amplifier whose indicated output is proportional to the amplitude of the signal input at a predetermined constant frequency. The input circuit consists of two separate channels coming into the connector 170 at points marked $E_V$ and $E_R$ which are associated with the unbalance voltage signals and the reference voltage signals, respectively. Hence, one channel is for $E_V$ and the other is for $E_R$. These channels are combined in an electronic mixing circuit 157 which discriminates the relative phase relation of $E_V$ with $E_R$. When the selector switch 172 is rotated to a first position "$E_R$" the $E_R$ signal is applied to one grid of a twin triode amplifier tube 173 such as a 6SC7 tube, and the $E_V$ signal is connected to the ground. In a second position "$E_V$" of switch 172, the $E_V$ signal is applied to the second grid of tube 173 and the $E_R$ signal is connected to the ground. Then, in a third position ("$E_R+E_V$") of the same switch, the $E_V$ and $E_R$ signals are applied to their respective grids. These signals are mixed by impressing the $E_V$ and $E_R$ signals from the two plate circuits of tube 173 upon the grid circuit of a triode detector amplifier tube 174 such as a 6C5 tube. The plate output of tube 174 is fed to the wave filter 161, which determines the frequency response of the amplifier unit 171. Wave filter 161 is connected to the grid of detector amplifier tube 175 such as a 6C5 triode detector which outputs to a resistance biased grid of a duplex-diode triode tube 176 such as the 6SQ7 type. The output of this tube is connected to a transformer 177 whose secondary is connected back to the diodes of this tube where the signal is rectified. Meter 163 is connected across the output of tube 176 by conductors, one terminating at a midpoint of the secondary side of transformer 176 while the other terminates at the cathode of tube 176. Power is supplied to the above tubes from a full wave rectifier tube 180 such as a 5Y3GT type tube, the output of which is regulated by two voltage regulator tubes 181 and 182, such as VR150—30 and VR90—30 type tubes, respectively. The A. C. input to the rectifier tube 180 is first filtered by line voltage filter condensers 183 connected across the primary of the power transformer 184 to prevent the line voltage from interfering with the signal voltages $E_V$ and $E_R$. The output of regulator tube 182 is loaded by two resistors 185 and 186 one of which, such as resistor 186, has a variable contactor 187 which through resistor 188 connects to the input transformer connected side of meter 163. It is noted that resistor 186 is so arranged in this regulator circuit that contactor 187 can be maintained at a steady voltage value above ground to buck out any voltage other than the signal voltages from the pick-off units to prevent their appearing at the meter 163 during the process of zeroing the meter in preparation for the taking of unbalance readings. This meter zeroing method eliminates extensive filtering of ripple voltages in the power supply and also eliminates signals picked up by inductive components of the amplifier.

With the selector switch turned to the "$E_R$" position, a maximum needle deflection indicates that balancing speed has been attained. This deflection can be varied with the "$E_R$" control 190 which includes a fairly high resistance. Adjustment is had by a movable contactor whose potential is measured above ground as shown. With the selector switch 172 turned to the "$E_V$" position, the meter reading is used to determine the amount of correction to be applied at a predetermined radius from the rotor axis. With the selector switch 172 turned to the "$E_R+E_V$" position, the angular locating dial or indicator 25 will show the unbalance position of the rotor when the meter 163 is zero. Shown near the switch 172 is a range switch 191 which functions as a multiplier when it is connected to the range adjustment resistors 192—194. When selector switch 172 is turned on and the range switch 191 is in a position connecting resistor 192 thereto, a small portion of a large $E_V$ signal is applied to the grid of the first tube 173. Other positions of the switch 191 give correspondingly larger portions of the applied $E_V$ as more resistance is cut out of the signal carrying circuit to this first tube 173. The scale to be read on the meter 163 corresponds to the position of the range switch 191.

The actual generation of the $E_V$ and $E_R$ signals is shown and described in this specification as being initiated by generator action within an electromagnetic pickup unit and by photoelectric cell means respectively. The inventive idea of the novel apparatus is not, however, to be limited by such precepts because other types of signal generators could be employed.

The meter 163 is made to read zero with no power on the amplifier unit 171 by turning a conventional adjustment screw on the face of the meter. Then, the selector switch 172 is turned to the "off" position and the power switch 166 to "on." If the meter does not indicate zero after a reasonable warm-up period, a meter zero adjustment in the potentiometer resistor 186 may be turned until the meter reads zero. This takes care of alternating current hum causing meter deflection. With the light beam from the exciter lamp 151 focused on the light area of the rotor surface, the "$E_R$" control 190 is adjusted for minimum resistance in the circuit opposing current flow, and the selector switch 172 is turned to the "$E_R$" position. Then, the $E_R$ sensitivity control 200, shown in series with the potentiometer resistor 199, is adjusted to give a slight needle deflection in the meter 163. The potentiometer resistors 290 and 190 having graduated values furnish a condition for minimizing any possible electrical phase shift to within five degrees. This feature eliminates a previous source of inaccuracy in taking positional unbalance readings.

The potentiometers 45 are set so that scales 46 and 47 associated with same read about "2." Next, power is turned on the amplifier unit 171 and the amplifier is allowed to warm up. Then the selector switch 172 is turned on to the "E_R" position. Next, the "E_R" resistance control 190 is adjusted to a position wherein the minimum amount of resistance in the control opposes the current flow. The operator must next rotate the lever 103 of the control valve 95 on the air block 80 to the "Start" position shown in Fig. 4. The operator should look for the maximum deflection of the meter 163. Then, after the resonant frequency of the wave filter is reached, the user can rotate the handle or lever 103 of the control valve 95 to the "Run" position. If the meter 163 shows an off-scale reading, the operator must rotate the "E_R" control 190, until the needle or pointer of this meter is within the scale. The operator will then rotate the control valve handle 103 to the "Run" position so that he can adjust the needle valve 117 by turning the knurled needle valve nut 119 until the meter remains at maximum deflection. The range switch 191 is moved to the first position wherein a maximum amount of resistance opposes the E_v signal. Then, the toggle switch 50 on the front of the bedplate 11 is put in the left pickup position.

Selector switch 172 is turned to the E_v position and since the meter is calibrated in terms of drill depth, the first drill-depth reading is recorded for the left end of the rotor. If one is unable to obtain a meter reading in the first position of the range switch 191, other positions can be selected to get such reading. If the meter reads off scale in the first instance, the left potentiometer 45 can be adjusted to keep meter deflections within view. Since the amount of unbalance at the left end of the rotor is now known, the next steps in balancing the same are to rotate the selector switch 172 to the "E_R" position and make the "E_R" meter reading equal to the "E_v" meter reading by adjusting the "E_R" control knob 190.

Next the selector switch 172 is turned to the "E_R + E_v" position and the left angular locating dial 25 is rotated until the needle of the meter 163 indicates zero deflection. The reading of dial 25 then gives the position of unbalance.

The above operations are repeated for the right end of the rotor, and hence, it is necessary to throw the toggle switch 50 to the "right." The operation set forth for the left end must normally be repeated in its entirety for the right end and, in this embodiment, the readings obtained on the left dial must be applied to the left correction plane of the rotor and the readings obtained from the right dial must be applied to the right correction plane of the rotor.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a device to determine the magnitude and location of an unbalance mass in a rotating body wherein means are included to generate a reference voltage of the same frequency as the spin frequency of the rotating body and a two-element electromagnetic pick-up device is employed at each end of the spin axis of the rotating body to generate a voltage having an amplitude proportional to the magnitude of the unbalance mass and a phase which when compared with the reference voltage is indicative of the location of the unbalance mass, the combination of a cradle to support the rotating body for rotation about its spin axis, a cradle holder supporting each end of the cradle, each cradle holder being coaxial with the spin axis of the rotating body, a headstock assembly for each end of the cradle, resilient means interconnecting each cradle holder and its associated headstock assembly, a first element of each electromagnetic pick-up device arranged coaxially on its respective cradle holder, and a second element of each electromagnetic pick-up device supported in its associated headstock assembly for independent rotation coaxially of its associated first element.

2. In a device to determine the magnitude and location of an unbalance mass in a rotating body wherein means are included to generate a reference voltage of the same frequency as the spin frequency of the rotating body and a two-element electromagnetic pick-up device is employed at each end of the spin axis of the rotating body to generate a voltage having an amplitude proportional to the magnitude of the unbalance mass and a phase which when compared with the reference voltage is indicative of the location of the unbalance mass, the combination of a cradle having bearing means to support the rotating body for rotation about its spin axis, a cradle holder supporting each end of the cradle, each cradle holder being coaxial with the spin axis of the rotating body, means to secure the cradle in the cradle holders, a headstock assembly for each end of the cradle, a resilient means interconnecting each cradle holder and its associated headstock assembly, a first element of each electromagnetic pick-up device arranged coaxially on its respective cradle holder, and a second element of each electromagnetic pick-up device supported in its associated headstock assembly for independent rotation coaxially of its associated first element.

3. In a device to determine the magnitude and location of an unbalance mass in a rotating body wherein means are included to generate a reference voltage of the same frequency as the spin frequency of the rotating body and a two-element electromagnetic pick-up device is employed at each end of the spin axis of the rotating body to generate a voltage having an amplitude proportional to the magnitude of the unbalance mass and a phase which when compared with the reference voltage is indicative of the location of the unbalance mass, the combination of a cradle to support the rotating body for rotation about its spin axis, a cradle holder supporting each end of the cradle, each cradle holder being coaxial with the spin axis of the rotating body, a headstock assembly for each end of the cradle, each headstock assembly having a plurality of arms extending toward the cradle, a plurality of resilient means interconnecting each cradle holder to the arms on its associated headstock assembly, a first element of each electromagnetic pick-up device arranged coaxially on its respective cradle holder, and a second element of each electromagnetic pick-up device supported in its associated headstock assembly for independent rotation coaxially of its associated first element.

4. In a device to determine the magnitude and location of an unbalance mass in a rotating body wherein means are included to generate a reference voltage of the same frequency as the spin frequency of the rotating body and a two-element electromagnetic pick-up device is employed at each end of the spin axis of the rotating body to generate a voltage having an amplitude proportional to the magnitude of the unbalance mass and a phase which when compared with the reference voltage is indicative of the location of the unbalance mass, the combination of a cradle to support the rotating body for rotation about its spin axis, a cradle holder supporting each end of the cradle, each cradle holder being coaxial with the spin axis of the rotating body, a headstock assembly for each end of the cradle, resilient means interconnecting each cradle holder and its associated headstock assembly, a first element of each electromagnetic pick-up device arranged coaxially on its respective cradle holder, a spindle mounted in each headstock assembly for rotation coaxially of the spin axis of the rotating body, and a second element of each electromagnetic pick-up device fixed on the spindle of its associated headstock assembly whereby it is rotatable coaxially of its associated first element.

5. In a device to determine the magnitude and location of an unbalance mass in a rotating body wherein means are included to generate a reference voltage of the same frequency as the spin frequency of the rotating body and a two-element electromagnetic pick-up device is employed at each end of the spin axis of the rotating body to generate a voltage having an amplitude proportional to the magnitude of the unbalance mass and a phase which when compared with the reference voltage is indicative of the location of the unbalance mass, the combination of a cradle to support the rotating body for rotation about its spin axis, a cradle holder supporting each end of the cradle, each cradle holder being coaxial with the spin axis of the rotating body, a headstock assembly for each end of the cradle, resilient means interconnecting each cradle holder and its associated headstock assembly, a first element of each electromagnetic pick-up device arranged coaxially on its respective cradle holder, each of the first elements comprising a soft-iron ring armature, and a second element of each electromagnetic pick-up device supported in its associated headstock assembly for independent rotation coaxially of its associated ring armature, each of the second elements comprising a U-shaped magnet having a soft-iron center pole extending into the center of the ring armature and having a pick-up coil wound on its center pole.

6. In a device to determine the magnitude and location of an unbalance mass in a rotating body wherein means are included to generate a reference voltage of the same frequency as the spin frequency of the rotating body and a two-element signal pick-up device is employed at each end of the spin axis of the rotating body to generate a voltage having an amplitude proportional to the magnitude of the unbalance mass and a phase which when compared with the reference voltage is indicative of the location of the unbalance mass, the combination of a cradle to support the rotating body for rotation about its spin axis, a cradle holder supporting each end of the cradle, each cradle holder being coaxial with the spin axis of the rotating body, a headstock assembly for each end of the cradle, resilient means interconnecting each cradle holder and its associated headstock assembly, a first element of each signal pick-up device arranged coaxially on its respective cradle holder, and a second element of each signal pick-up device supported in its associated headstock assembly for independent rotation coaxially of its associated first element.

KARL F. FRANK.

REFERENCES CITED

The following references are of record in the file of this patent:

UNITED STATES PATENTS

| Number | Name | Date |
|---|---|---|
| 1,210,085 | Leblanc | Dec. 26, 1916 |
| 1,263,325 | Klahn | Apr. 16, 1918 |
| 1,600,569 | Sperry | Sept. 21, 1926 |
| 2,140,398 | Buckingham | Dec. 13, 1938 |
| 2,243,457 | Esval et al. | May 27, 1941 |
| 2,243,458 | Esval et al. | May 27, 1941 |
| 2,289,074 | Rushing et al. | July 7, 1942 |
| 2,293,371 | Van Degrift | Aug. 18, 1942 |
| 2,306,625 | Hazen | Dec. 29, 1942 |
| 2,382,673 | Sihvonen et al. | Aug. 14, 1945 |
| 2,382,843 | Annis | Aug. 14, 1945 |
| 2,383,588 | Bousky | Aug. 28, 1945 |
| 2,405,474 | Van De Grift | Aug. 6, 1946 |
| 2,405,430 | Kent | Aug. 6, 1946 |
| 2,487,035 | Weaver et al. | Nov. 1, 1949 |